United States Patent
Prakash et al.

(10) Patent No.: US 11,113,782 B2
(45) Date of Patent: Sep. 7, 2021

(54) DYNAMIC KERNEL SLICING FOR VGPU SHARING IN SERVERLESS COMPUTING SYSTEMS

(71) Applicant: VMware, Inc., Palo Alto, CA (US)

(72) Inventors: Chandra Prakash, Mumbai (IN); Anshuj Garg, Mumbai (IN); Uday Pundalik Kurkure, Los Altos Hills, CA (US); Hari Sivaraman, Livermore, CA (US); Lan Vu, Palo Alto, CA (US); Sairam Veeraswamy, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 48 days.

(21) Appl. No.: 16/601,831

(22) Filed: Oct. 15, 2019

(65) Prior Publication Data

US 2021/0110506 A1   Apr. 15, 2021

(51) Int. Cl.
  *G06T 1/20* (2006.01)
  *G06F 9/455* (2018.01)
  *G06F 9/48* (2006.01)

(52) U.S. Cl.
  CPC ............ *G06T 1/20* (2013.01); *G06F 9/45533* (2013.01); *G06F 9/45558* (2013.01); *G06F 9/4887* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 10,176,550 B1 * | 1/2019 | Baggerman | G06T 1/20 |
| 2001/0049595 A1 | 12/2001 | Plumer et al. | |
| 2013/0021353 A1 * | 1/2013 | Drebin | G06F 9/5077 345/522 |

(Continued)

FOREIGN PATENT DOCUMENTS

JP   2019008421 A   1/2019

OTHER PUBLICATIONS

Zhong, Jianlong, and Bingsheng He. "Kernelet High-throughput GPU kernel executions with dynamic slicing and scheduling." IEEE Transactions on Parallel and Distributed Systems 25.6 (2013): 1522-1532, Mar. 2013.

*Primary Examiner* — Joni Hsu
(74) *Attorney, Agent, or Firm* — Thomas | Horstemeyer, LLP

(57) ABSTRACT

Various examples are disclosed for dynamic kernel slicing for virtual graphics processing unit (vGPU) sharing in serverless computing systems. A computing device is configured to provide a serverless computing service, receive a request for execution of program code in the serverless computing service in which a plurality of virtual graphics processing units (vGPUs) are used in the execution of the program code, determine a slice size to partition a compute kernel of the program code into a plurality of sub-kernels for concurrent execution by the vGPUs, the slice size being determined for individual ones of the sub-kernels based on an optimization function that considers a load on a GPU, determine an execution schedule for executing the individual ones of the sub-kernels on the vGPUs in accordance with a scheduling policy, and execute the sub-kernels on the vGPUs as partitioned in accordance with the execution schedule.

20 Claims, 12 Drawing Sheets

(56) References Cited

U.S. PATENT DOCUMENTS

| | | | |
|---|---|---|---|
| 2013/0191612 A1* | 7/2013 | Li | G06T 15/005 |
| | | | 712/30 |
| 2015/0029200 A1* | 1/2015 | Khosa | G06F 9/45558 |
| | | | 345/522 |
| 2015/0120928 A1* | 4/2015 | Gummaraju | H04L 67/1008 |
| | | | 709/226 |
| 2015/0363239 A1 | 12/2015 | Hsu et al. | |
| 2016/0189332 A1* | 6/2016 | Yoo | G06F 3/14 |
| | | | 345/156 |
| 2018/0039509 A1 | 2/2018 | Phelan et al. | |
| 2018/0189215 A1* | 7/2018 | Boesch | G06N 3/08 |
| 2019/0007258 A1* | 1/2019 | Surcouf | G06F 9/5083 |
| 2021/0019320 A1* | 1/2021 | Storm | G06F 16/24545 |

\* cited by examiner

Algorithm 3: Procedure to add new functions in Slicer library

Data: S_M: Shared Memory
1. i = 0: loop controller;
2. S: Kernel slice size;
3. B: total_number of blocks;
4. Create *struct sched_info* S_I in S_M;
5. Allocate vGPU device memory;
6. while *(i < B)* do
7.     while *cont_wait == 1* do
8.         sleep();
9.     end
10.     Stop scheduler, *sched_signal = 0*;
11.     S = S_I→slice_size;
12.     if *((B-i) < S)* then
13.         S = B-i;
14.     end
15.     if *(S > 0)* then
16.         Launch kernel with slice size (S) provided by Scheduler;
17.         cudaDeviceSynchronize();
18.     end
19.     Put the container in wait, *cont_wait = 1*;
20.     Start the Scheduler, *sched_signal = 1*;
21.     i = i + S;
22. end
23. Set the S_I→done to 1 to indicate scheduler that job is done;
24. Mark the current position as empty to be reused again;
25. Free the allocated device memory;

FIG. 7

Algorithm 1: Scheduling of functions' slices

Data: $R_i$ = Result of INLP solver for $i^{th}$ round (cont_id, slice_size)

Result: Slice size for every functions in each round.

1  n: number of rounds i.e. number of entries in R;
2  N: number of functions in VM;
3  cont_id$_i$: container Id of container hosting function $f_i$;
4  j = 1;
5  while *(j ≤ n)* do
6      for *(i=1 to N)* do
7          if *(cont_id$_i$ === R$_j$.cont_id)* then
8              slice_size$_i$ = R$_j$.slice_size;
9              j++;
10         else
11             slice_size$_i$ = 0;
12         end
13     end
14 end

*FIG. 8*

Algorithm 2: Procedure for kernel slicing and scheduling

Data: S_M: Shared Memory, G_U: GPU utilization
1. D_S: Temporary data structure of Scheduler;
2. S_E: Scheduling Entity (function);
3. E: struct sched_info (table 4);
4. S: Kernel Slice Size, E→slice_size;
5. while *true* do
6.     foreach *element E in S_M* do
7.         Update time entries in E;
8.         if *E is not in D_S (E→queue_entry == 0)* then
9.             insert E in D_S;
10.             E→queue_entry = 1;
11.         end
12.     end
13.     foreach *element in D_S* do
14.         Get a S_E from D_S according to scheduler (RR or priority);
15.         if *job of S_E is done* then
16.             Delete S_E from D_S and S_M;
17.         else
18.             break;
19.         end
20.     end
21.     Find S for S_E using algorithm 1;
22.     Set kernel slice size for S_E = S;
23.     Allow S_E to launch kernel having S blocks, *cont_wait = 0*;
24. end

FIG. 9

DYNAMIC KERNEL SLICING FOR VGPU SHARING IN SERVERLESS COMPUTING SYSTEMS

BACKGROUND

Data centers include various physical and virtual components that, when executed, provide web services, cloud computing environments, virtualization environments, as well as other distributed computing systems. For instance, data centers include hardware and software configured to provide computer virtualization services, which operate virtualized versions of a physical device, such as a server, storage device, central processing unit (CPU), graphics processing unit (GPU), or other physical computing resource. Some data centers include virtual machines (VMs), which are emulations of a computer system that can be customized to include a predefined amount of random access memory (RAM), hard drive storage space, as well as other computing resources that emulate a physical machine. Recently, some data centers have been modified to provide virtual graphics processing units (vGPUs) resources.

A recent advent in cloud computing includes "serverless computing systems," where a third-party computing provider offers time-constrained computing resources via a server, usually employed to execute an application or algorithm that does not require continuous uptime. For instance, serverless computing systems require a developer or administrator to upload a piece of code to a serverless computing environment, and the serverless computing environment executes the code without having the developer being burdened with the setup of a server, which can require configuration of computing, storage, and network resources, merely to execute the code. As the pricing in serverless computing systems is based on the actual amount of resources consumed by the application, as opposed to pre-purchased capacity, and due to not having to maintain a server with continuous uptime, serverless computing is becoming a popular computing resource.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 6A and 6B are block diagrams illustrating slicing mechanisms for two-dimensional kernels.

FIG. 7 is an example of pseudocode for adding a new function to a library for a slicing module.

FIG. 8 is an example of pseudocode for scheduling slices of a function into sub-kernels.

FIG. 9 is an example of pseudocode for kernel slicing and execution scheduling.

DETAILED DESCRIPTION

Figure 1:
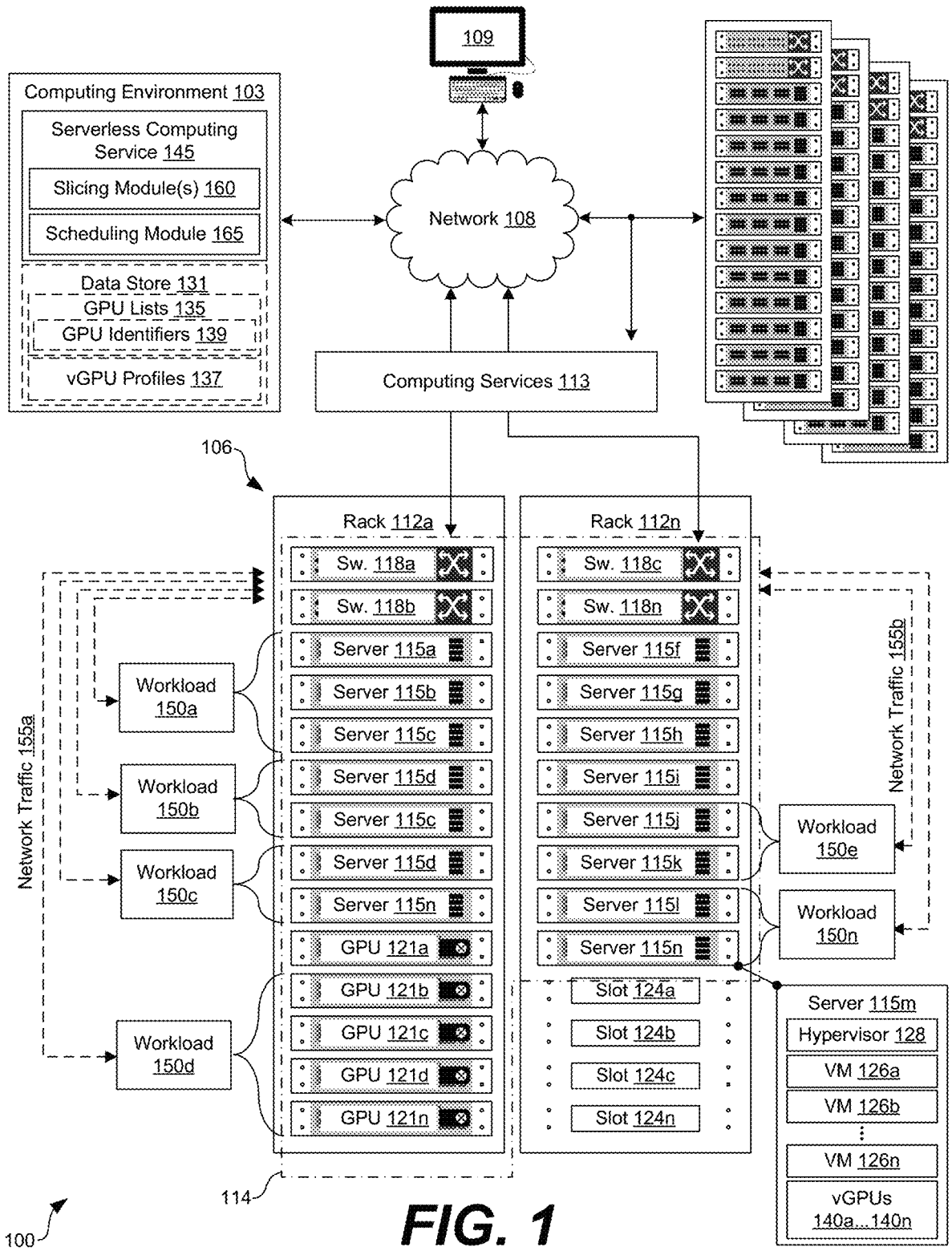
FIG. 1 is a drawing of an example of a networked computing environment having a serverless computing service for dynamic kernel slicing using GPUs in the networked computing environment.

The present disclosure relates to dynamic kernel slicing for virtual graphics processing unit sharing, and other resource sharing, in serverless and similar computing systems. The popularity of serverless computing is increasing due to various benefits, such as limited management overhead, low cost, scalability, etc. As opposed to provisioning and maintaining a server month after month, an end user only needs to write a function and submit the function, or other program code, through a graphical user interface or an application programming interface (API) of a serverless computing service provider. As such, serverless computing services have been referred to as a function-as-a-service (FaaS). The developer or other end user pays for resources proportional to how many times the function is invoked, instead of paying for costly resources of a data center.

However, some service providers place a limit on the maximum period of computation permitted in a serverless execution space. For instance, a default time limit in some serverless execution space is three seconds, and the maximum limit is 900 seconds. As such, some service providers stop execution if the time exceeds a predetermined time limit. As time is a restraint in these computing systems, for some applications, the computational capacity of graphics processing units (GPU) can be employed to reduce computation time by using a single-instruction-multiple-thread (SIMT) architecture. For instance, some deep learning models executed in serverless execution spaces have been observed to have a better performance-to-cost ratio when executed on a GPU as opposed to a traditional central processing unit (CPU).

Further, some service providers host computing functions in containers, where the containers are executed in a virtual machine. The virtual machine can access resources of a physical GPU using, for example, a pass-through mode of operation or a vGPU mode of operation. Notably, only one virtual machine can use a single GPU in the pass-through mode of operation, while multiple virtual machines can use a single GPU in a vGPU mode of operation. In other words, resources of a GPU can be shared across multiple virtual machines using virtualization in the vGPU mode of operation.

As such, multiple vGPUs can be multiplexed onto a physical GPU using various types of scheduling, such as fixed share, equal share, and best effort scheduling. Best effort scheduling has been observed to perform better in terms of speedup and GPU utilization as compared to equal share scheduling, but at the cost of non-determinism in GPU cycles available to each virtual machine. Other than non-deterministic GPU sharing, another issue with vGPU is the default scheduling policy for the tasks within a VM. The best effort scheduling supports round-robin scheduling at the vGPU- and GPU-level. The proprietary nature of the drivers, however, prevents others from controlling or modifying scheduling.

In various examples herein, a computing environment can perform kernel slicing to control the scheduling of an application on a GPU in which a large size application kernel, referred to as a computational kernel, is divided into several small size sub-kernels, also referred to herein as slices. Sub-kernels of different applications are launched in a predefined order to control the scheduling depending upon a scheduling policy. For instance, for computational kernels that invoke matrix multiplication, vector addition, and other functions that can be divided to be executed concurrently or in parallel, the computational kernel can be partitions into sub-kernels to be executed in parallel.

Accordingly, in various examples, a system for dynamic kernel slicing in a serverless computing service can be provided that includes a computing environment and program instructions stored in memory and executable in the computing environment that direct the computing environment to provide a serverless computing service. The computing environment can receive a request for execution of program code in the serverless computing service in which a plurality of virtual graphics processing units (vGPUs) are used in the execution of the program code. Further, the computing environment can determine a slice size to partition a compute kernel of the program code into a plurality of sub-kernels for concurrent execution by the vGPUs. The slice size and an execution schedule is determined for individual ones of the sub-kernels to maximize a number of functions executed within a predetermined time, such as a deadline provided by a developer or set by a service provider. In some examples, the computing environment can determine the execution schedule for executing the individual ones of the sub-kernels on the vGPUs in accordance with a scheduling policy and execute the sub-kernels on the vGPUs as partitioned in accordance with the execution schedule.

In further examples, the request for execution of the program code is associated with an execution deadline, such as one set by a developer or a default execution deadline predefined by a computing service provider. The computing environment can schedule individual ones of the sub-kernels in accordance with the scheduling policy based at least in part on the execution deadline. In some examples, the scheduling policy is determined as a function of at least two of: the execution deadline, a number of blocks in a task of the compute kernel, an arrival time of the task, a start time of a workload switch on the GPU, an end time of the workload switch on the GPU, a load at the time of the workload switch on the GPU, a total number of load switches on the GPU, a set of possible slice sizes for the task, a total number of workloads, an expected execution time of one of the sub-kernels, an elapsed time, a total number of tasks to be scheduled, as well as other variables as will be discussed.

To maximize a number of tasks completed with the execution deadline, the serverless computing service can utilize an optimization function in accordance with the scheduling policy. In some examples, the optimization function comprises an integer non-linear program (INLP). In embodiments in which executing the optimization function, such as the INLP, on a large number of tasks would exceed a predetermined time threshold, the serverless computing service can execute the optimization function on a subset of the tasks and extrapolate the scheduling determined using the optimization function to an entirety of the tasks.

Turning now to FIG. 1, an example of a networked environment 100 is shown. The networked environment 100 can include a computing environment 103 and various computing systems 106 in communication with one other over a network 108. The network 108 can include, for example, the Internet, intranets, extranets, wide area networks (WANs), local area networks (LANs), wired networks, wireless networks, other suitable networks, or any combination of two or more such networks.

The networks of the networked environment 100 can include satellite networks, cable networks, Ethernet networks, telephony networks, and other types of networks. The computing systems 106 can include devices installed in racks 112a . . . 112n (collectively "racks 112"), which can make up a server bank, aggregate computing system, or a computer bank in a data center or other like facility. In some examples, the computing systems 106 can include high-availability computing systems, which includes a group of computing devices that acts as a single system and provides a continuous uptime. The devices in the computing systems 106 can include any number of physical machines, virtual machines, virtual appliances, and software associated therewith, such as operating systems, drivers, hypervisors, scripts, and applications.

The computing systems 106, and the various hardware and software components contained therein, can include infrastructure of the networked environment 100 that provide one or more computing services 113. Computing services 113 can include virtualization services in some examples. For instance, the computing services 113 can include those that serve up virtual desktops to end users. Thus, the computing environment 103 can also be described as a virtual desktop infrastructure (VDI) environment in some examples.

In other examples, the computing services 113 can include those that provide a public cloud computing environment, a private cloud computing environment, or a hybrid cloud computing environment, which includes a combination of a public and private cloud computing environment. As such, the computing environment 103 can be referred to as a cloud computing environment in some examples.

In further examples, the computing services 113 can provide a serverless computing environment that allows developers and other end users to provide code for execution. For instance, a developer or other end user can access a user interface served by the computing environment 103 to upload a program, application, or other code to execute without having to provision and maintain a server. In some examples, the developer or other end user can configure settings associated with the execution of the code. For instance, the developer can specify in a user interface whether one or more GPUs or vGPUs should be utilized in the execution of the program code, which can decrease the execution time and the amount of resources utilized in the execution of the program code.

The computing environment 103 can include an enterprise computing environment that includes hundreds or even thousands of physical machines, virtual machines, and other software implemented in devices stored in racks 112, distributed geographically, and connected to one another through the network 108. As such, the computing environment 103 can be referred to as a distributed computing environment in some examples. It is understood that any virtual machine or virtual appliance is implemented using at least one physical device, such as a server or other computing device. For instance, a vGPU offered as a computing service 113 can be implemented using one or more physical graphics processing units.

The devices in the racks 112 can include various physical computing resources 114. The physical computing resources 114 can include, for example, physical computing hardware, such as memory and storage devices, servers 115a . . . 115n, switches 118a . . . 118n, graphics cards having one or more GPUs 121a . . . 121n installed thereon, central processing units (CPUs), power supplies, and similar devices. The devices, such as servers 115 and switches 118, can have dimensions suitable for quick installation in slots 124a . . . 124n on the racks 112. In various examples, the servers 115 can include requisite physical hardware and software to create and manage virtualization infrastructure, a cloud computing environment, and/or a serverless computing environment. Also, in some examples, the physical computing resources 114 can be used to provide virtual computing resources, such as virtual machines or other software, as a computing service 113.

Further, in some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112. Additionally, if a server 115 includes an instance of a virtual machine, the server 115 can be referred to as a "host" while the virtual machine can be referred to as a "guest."

Each server 115, such as representative server 115m, can act as a host in the networked environment 100, and thereby can include one or more virtual machines 126a . . . 126n (collectively "virtual machines 126"). In some examples, a hypervisor 128 can be installed on a server 115 to support a virtual machine execution space within which one or more virtual machines 126 can be concurrently instantiated and executed. The hypervisor 128 can include the ESX™ hypervisor by VMware®, the ESXi™ hypervisor by VMware®, or similar hypervisor 128 in some examples. It is understood that the computing systems 106 can be scalable, meaning that the computing systems 106 in the networked environment 100 can increase or decrease dynamically to include or remove servers 115, switches 118, GPUs 121, power sources, and other components without downtime or otherwise impairing performance of the computing services 113 offered up by the computing systems 106.

The computing services 113 can be offered through execution of an application or service on one or more of the virtual machines 126. As such, the computing services 113 can include, for example, web services that can be invoked through an application programming interface through submission of requests over the network 108 for particular actions to be performed or for particular data to be returned. Additionally, in some examples, the computing services 113 can be implemented in computing containers, where each of the containers can include a self-contained execution environment having its own CPU, memory, block input/output (I/O), and network resources which is isolated from other containers. In some examples, one or more containers can be executed in a virtual machine 126.

Referring now to the computing environment 103, the computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples. Although shown separately from the computing systems 106, it is understood that in some examples the computing environment 103 can be included as all or a part of the computing systems 106.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 109 over the network 108, sometimes remotely, the computing environment 103 can be described as a remote computing environment 103 in some examples. Additionally, in various examples, the computing environment 103 can be implemented in servers 115 of a rack 112, and can manage operations of a virtualized or cloud computing environment through interaction with the computing services 113.

The computing environment 103 can include a data store 131. The data store 131 can include memory of the computing environment 103, mass storage resources of the computing environment 103, or any other storage resources on which data can be stored by the computing environment 103. The data store 131 can include memory of the servers 115 in some examples. For instance, the data store 131 can include one or more relational databases, such as structured query language (SQL) databases, non-SQL databases, or other relational or non-relational databases. The data stored in the data store 131, for example, can be associated with the operation of the various services or functional entities described below.

The data store 131 can include a database or other memory that includes, for example, GPU lists 135, vGPU profiles 137, as well as other data. The GPU lists 135 can include data, such as database entries, corresponding to physical GPUs 121 and VGPUs 140a . . . 140n operating in the networked environment 100. In some examples, the GPU lists 135 can include GPU identifiers 139 for each of the GPUs 121 and vGPUs 140. The GPU identifiers 139 can include, for example, alphanumeric characters or other suitable characters for uniquely identifying a GPU 121.

Each of the virtual machines 126 in the networked environment 100 can have a corresponding vGPU profile 137. Generally, the vGPU profile 137 provides performance characteristics for a vGPU to be utilized by a virtual machine 126. For instance, a vGPU profile 137 can specify an amount of graphics memory each virtual machine 126 is able to access, in addition to other performance criteria. As a result, administrators are able to select a vGPU profile 137 that is beneficial for graphics-intensive use cases, while allocating a different vGPU profile 137 on less graphics-intensive applications. By defining one or more vGPU profiles 137, one or more vGPUs 140 can be executed on a single physical GPU 121.

The components executed on the computing environment 103 can include, for example, a serverless computing service 145 as well as other applications, services, processes, systems, engines, or functionality not discussed in detail herein. The serverless computing service 145 can oversee the operation of the networked environment 100 to provide a serverless computing environment through management of the computing systems 106 as well as the physical and virtual computing resources 114 that make up the computing systems 106. In some examples, an enterprise, organization, or other entity can operate the computing environment 103 to oversee or manage the operation of devices in the racks 112, such as servers 115, switches 118, GPUs 121, virtual machines 126, vGPUs 140, power supplies, cooling systems, and other components.

The serverless computing service 145 can permit a developer and other end user to upload or otherwise provide code for execution, for instance, without requiring the developer to provision a server. In some examples, a developer or other end user can access a user interface served up by the serverless computing service 145 to upload, copy and paste, or otherwise provide code to execute. In other examples, the developer or other end user can access the serverless computing service 145 through one or more APIs to provide code for the serverless computing service 145 to execute remotely. After execution, the serverless computing service 145 provides the developer with data or other output resulting from execution of the code.

In some examples, the serverless computing service 145 can permit the developer or other end user to configure settings associated with the execution of the code. For instance, the developer can specify whether one or more GPUs 121 or vGPUs 140 are to be utilized in the execution of the program code provided by the developer. For certain code having portions capable of execution concurrently, the execution time and the amount of resources utilized in the execution of the program code can be reduced using GPUs 121 and/or vGPUs 140, as can be appreciated. In other words, the GPUs 121 and the vGPUs 140 act as accelerators to decrease processing time for the code provided by the developer.

Ultimately, the various physical and virtual components of the computing systems 106 can process workloads 150a . . . 150n. Workloads 150 can refer to the amount of processing that a server 115, switch 118, GPU 121, or other physical or virtual component has been instructed to process or route at a given time. The workloads 150 can be associated with virtual machines 126, public cloud services, private cloud services, hybrid cloud services, virtualization services, device management services, containers, or other software executing on the servers 115. For instance, the workloads 150 can include tasks to be processed to provide end users with the serverless computing service 145, remote desktop sessions, cloud environment, or other virtualized computing infrastructure.

The serverless computing service 145 can maintain a listing of active or inactive workloads 150 as well as oversee the assignment of various workloads 150 to various devices in the computing systems 106. For instance, the computing environment management service 145 can assign a workload 150 lacking available resources to a CPU or GPU 121 that has resources sufficient to handle the workload 150. The workloads 150 can be routed to various servers 115 by the switches 118 as network traffic 155a . . . 155b.

Now, the operation of the serverless computing service 145 is discussed. Deadlines can be considered in offering the serverless computing service 145. Some existing systems, such as those that utilize static kernel slicing, reduce flexibility of a computing environment 103 or administrator in performing scheduling decisions. However, the examples described herein increase the number of tasks completed within a deadline, such as one set by the serverless computing service 145 or one set by a developer. The examples described herein were compared with existing round-robin and earliest-deadline-first (EDF) scheduling. It was observed that using round-robin scheduling alone performs poorly in terms of completing the execution of tasks within their deadline.

However, GPUs 121 are popular hardware accelerators that are increasingly used in different fields for accelerating compute-intensive tasks, such as machine learning, computer vision, and artificial intelligence. Various service providers offer instances of virtual machines 126 with GPU 121 capability. The traditional GPU 121 architecture was not virtualized. However, vGPUs 140 were recently introduced, where the vGPUs 140 allow a single physical GPU 121 to be split into multiple vGPUs 140.

In some examples, the vGPUs 140 can be allocated to virtual machines 126, which can utilize the computing resources of the vGPUs 140 (and the underlying GPU 121). The number of vGPUs 140 and memory per vGPUs 140 is determined by the vGPU profile 137. For example, if the computing environment includes an AlphaCo GPU 121 having 16 GB memory, the GPU 121 supports vGPU profiles 137 of 1q, 2q, 4q, 8q, and 16q. The number of vGPUs 140 and memory per vGPU 140 for vGPU profiles 137 of 1q, 2q, 4q, 8q, and 16qg will be f16, 8, 4, 2, and 1 g, and f1, 2, 4, 8, and 16 g, respectively. So, if a vGPU profile 137 is set to 2q, then eight vGPUs 140 will be provided with 2 GB memory each and eight virtual machines 126 can be allocated to the vGPUs 140. Note that one virtual machine 126 can have at most one vGPU 140 in some examples. The multiplexing of the physical GPU 121 among multiple vGPUs 140 is controlled by a vGPU scheduling algorithm.

Currently, various types of vGPUs 140 support three types of vGPU scheduling algorithms including fixed share, equal share, and best effort scheduling. Fixed-share scheduling divides a GPU 121 into the number of slices equal to the total number of vGPUs 140 possible with a selected vGPU profile 137. For example, if the vGPU profile 137 for a GPU 121 is set to 2q, there will be eight time slices, one per vGPU 140. In equal-share scheduling algorithm, a GPU 121 is split into time slices equal to the number of virtual machines 126 that are allocated to the GPU 121 and turned on. For example, a 2q vGPU profile 137 will expose eight vGPUs 140 and, out of the eight vGPUs 140, if only six are allocated to virtual machines 126 and all of those virtual machines 126 are turned on, then the GPU 121 will be split into six time slices. The best-effort scheduling algorithm is work conservation, and the time slices created depend upon whether a virtual machine 126 has a GPU-based task to execute.

Accordingly, in various examples described herein, the serverless computing service 145 can perform kernel slicing to control scheduling of applications or other code on the GPU 121 to reduce the deficiencies in first-come-first-serve (FCFS) and other existing scheduling routines. To this end, the serverless computing service 145 can, for a large size computational kernel (the number of blocks per kernel launch), partition or divide a computational kernel of program code into several small size sub-kernels that can be executed concurrently or in parallel. To meet a predetermined deadline or other time constraint, sub-kernels of different applications are launched in a predefined order to control the scheduling strategy depending upon various scheduling policies, such as priority-based scheduling, as will be discussed.

TABLE 1

Impact of First-Come-First Service
on Waiting Time and Completion Time

| Kernel | Arrival Time | Execution Time | Waiting Time | Completion Time |
|---|---|---|---|---|
| $K_1$<<<1000, 512>>> | 0 | 10 | 0 | 10 |
| $K_2$<<<500, 512>>> | 3 | 5 | 7 | 12 |
| $K_3$<<<100, 512>>> | 5 | 1 | 10 | 11 |

Figure 2:
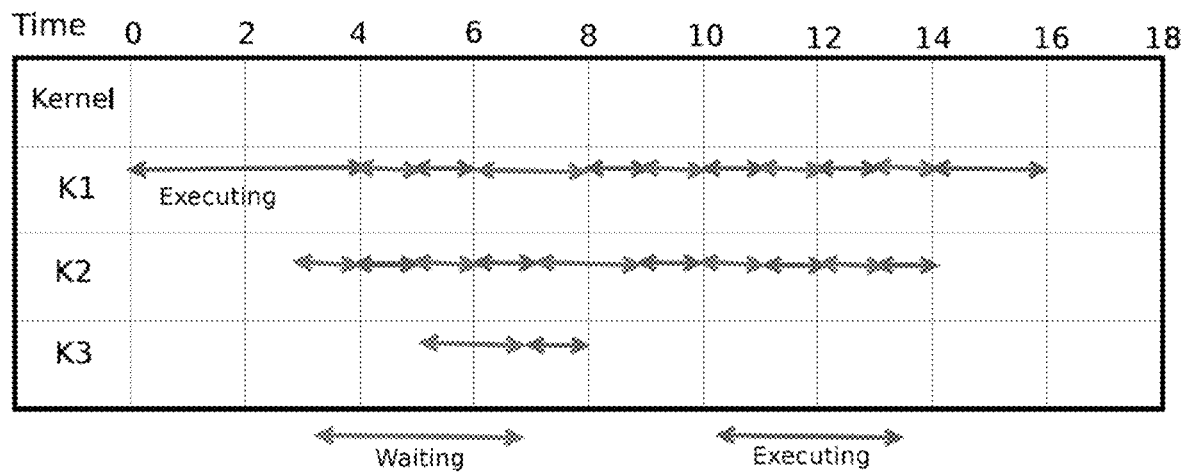
FIG. 2 is a chart illustrating an impact of slicing where a slice size is set at one-hundred.

For example, consider the scheduling of three computational kernels, $K_1$, $K_2$, and $K_3$, on a GPU 121 as shown in Table 1 above. The computational kernels may include three applications provided by a developer through the serverless computing service 145. Kernels $K_2$ and $K_3$ have an execution time of five and one second only, respectively, but have to wait for seven and ten seconds to use the GPU 121. The waiting time of kernels $K_2$ and $K_3$ is reduced sharply due to kernel slicing where the slice size is one-hundred with round-robin scheduling when compared to the first-come-first-serve scheduling, as shown in Table 2 and illustrated in FIG. 2. Specifically, FIG. 2 illustrates the impact of slicing when the slice size is one-hundred. The average waiting time is reduced to four seconds, but the completion time of $K_1$ is increased to sixteen seconds, up from ten seconds.

TABLE 2

Impact of Slicing Time (Slice Size = 100)

| Kernel | No. of Slices | Waiting Time | Completion Time |
|---|---|---|---|
| $K_1$<<<1000, 512>>> | 10 | 6 | 16 |
| $K_2$<<<500, 512>>> | 5 | 4 | 9 |
| $K_3$<<<100, 512>>> | 1 | 2 | 3 |

Currently, service providers only support execution of code on CPUs, and the service providers put restrictions on the maximum time for completing the execution of code made up of one or more functions. Functions can include software routines, such as matrix multiplication or addition routines, vector multiplication or addition, as well as other routines. For instance, many service providers provide a default timeout of three seconds and a maximum allowed time is 900 seconds. Functions suitable for SIMT models, such as matrix multiplication and vector addition, can receive benefits of processing using a GPU 121 to complete execution within a narrow time limit, which can take longer to execute on a CPU. In other words, functions that are able to be divided and processed concurrently can receive benefits of decreased processing time in serverless computing environments using GPUs 121.

To provide serverless computing resources, in some examples, functions can be hosted using a container running inside a virtual machine 126, referred to as a "nested setup," as opposed to containers running on a physical machine (PM). Overcommitment is only possible in terms of cores, not in terms of memory, in systems that employ virtualized GPUs 121. For example, consider a P100 GPU 121 having 3840 cores and 24 GB memory. The possible memory size with vGPU profiles 137 are 1 GB, 2 GB, 3 GB, 4 GB, 6 GB, 8 GB, 12 GB, and 24 GB; however, only one vGPU profile 137 can be used for a GPU 121 at a given time. If a 1 GB vGPU profile 137 is considered, then twenty-four vGPUs 140 having 3840 cores each and 12 vGPUs in case of 2 GB profile having 3840 cores each can be created. As such, the serverless computing service 145 can overcommit cores, but not memory of the GPU 121. Notably, in some systems, one virtual machine 126 can only have one vGPU 140.

As noted above, there are three different kinds of vGPU 140 to GPU 121 scheduling. Best-effort scheduling tends to provide better performance when compared to fixed and equal share scheduling. In a nested setup, available GPU cycles for a virtual machine 126 will not remain constant for best effort and equal share scheduling. As such, actions should be performed according to the availability of GPU cycles. In best effort scheduling, available GPU cycles per virtual machine 126 will decrease if the load on the virtual machines 126 (or vGPUs 140) increases for a GPU 121 and vice versa. Available GPU cycles per virtual machine 126 is dependent on the number of vGPUs 140 assigned to the virtual machines 126 for equal share scheduling, which is independent of the load on the virtual machines 126 and vGPUs 140. In both cases of increased or decreased GPU cycles, actions need to be performed either to avail the benefits of increased available GPU cycles or to avoid rejection of function execution due to the time limit if an available GPU cycle has decreased.

Figure 3:
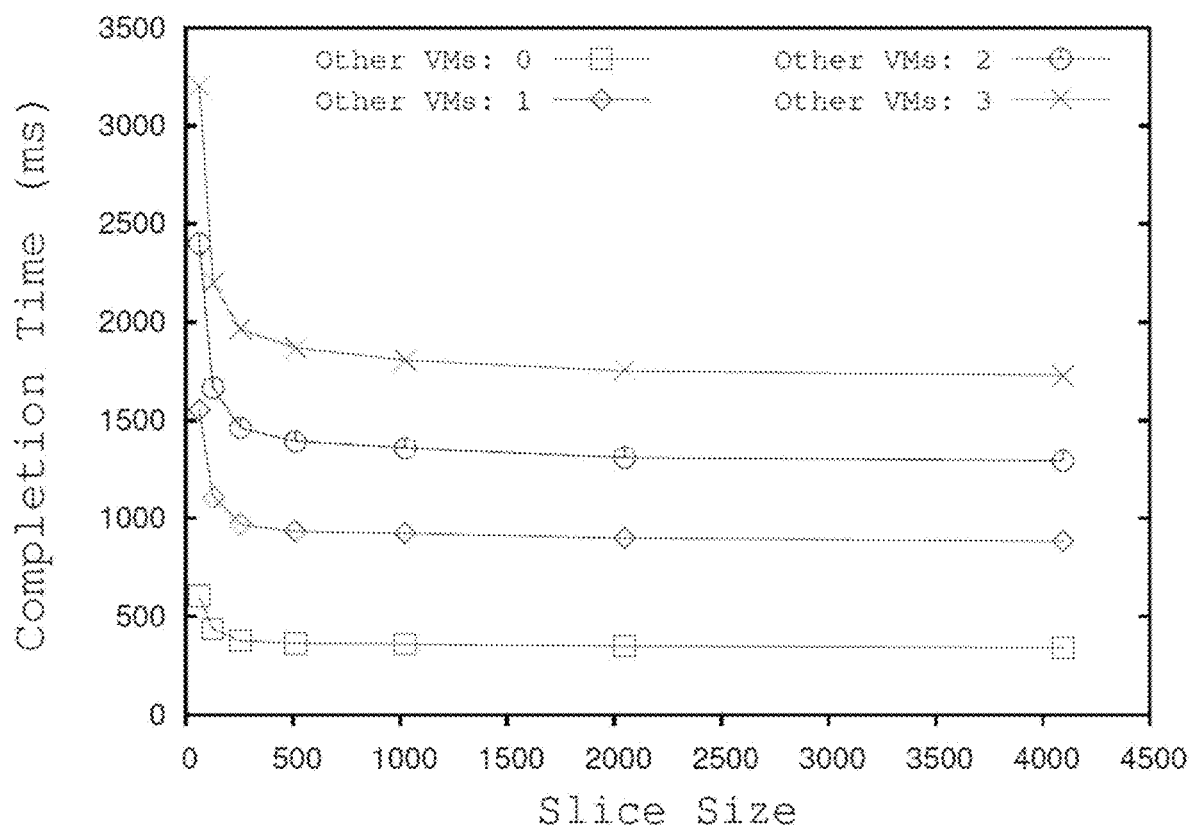
FIG. 3 is a chart illustrating completion time of matrix multiplication with varying loads on a GPU.

With respect to FIG. 3, a chart is shown detailing the impact of varying slice size on the completion time for matrix multiplication (e.g., square matrix: 4096×4096) due to a varying load upon a GPU 121. When selecting slice size, there is a trade-off between task completion time and scheduling frequency. A small slice size gives better scheduling frequency, but more time is needed to complete processing of the task. The opposite is true for large slice sizes.

As such, according to various examples, a load on a GPU 121 can be changed by running additional virtual machines 126 with a workload 150, such as a convolutional neural network (CNN) showing around 92% vGPU utilization, along with a virtual machine 127 hosting various functions. FIG. 3 shows that the completion time is directly proportional to the load on GPU 121, and the completion time sharply decreases by increasing the slice size. Further, FIG. 3 shows that slice execution time increases by increasing the slice size and the load on the GPU 121, also shown in Table 3 below. In other words, a smaller slice size takes a small time to complete, as shown in Table 3, but the smaller slice size takes a larger time to complete a task of a function when compared to a larger slice size with the same load on a GPU 121 due to overhead.

TABLE 3

Slice Execution Time for Matrix Multiplication
with Different Load Condition on GPU

| Slice Size (S) | Execution Time: 1 VM (ms) | Execution Time: 2 VM (ms) | Execution Time: 3 VM (ms) | Execution Time: 4 VM (ms) |
|---|---|---|---|---|
| 4096 | 85.75 | 220.4 | 323.25 | 423.1 |
| 2048 | 43.67 | 112.32 | 163.525 | 214.47 |
| 1024 | 22.48 | 57.7 | 84.78 | 110.7 |
| 512 | 11.36 | 29.1 | 43.48 | 57.08 |
| 256 | 5.89 | 15.11 | 22.85 | 30.04 |
| 128 | 3.42 | 8.64 | 13.01 | 17.08 |
| 64 | 2.36 | 6.06 | 9.37 | 12.42 |

Let 'v' be multiple virtual machines 126, each having one vGPU 140 with the same vGPU profile 137, where the hosting physical machine has one GPU 121. Best-effort scheduling can be used for scheduling vGPUs 140. Given 'n' functions, f1, f2, . . . fn, with deadline '$t_i$' hosted in the same virtual machine 126, it is desirable to find a solution for the nested setup that maximizes a number of functions completed within a time-limit, such as a deadline set by a service provider. The solution should determine the scheduling order for the computational kernel(s) and the slice size of a kernel scheduled to use a vGPU 140.

Figure 4:
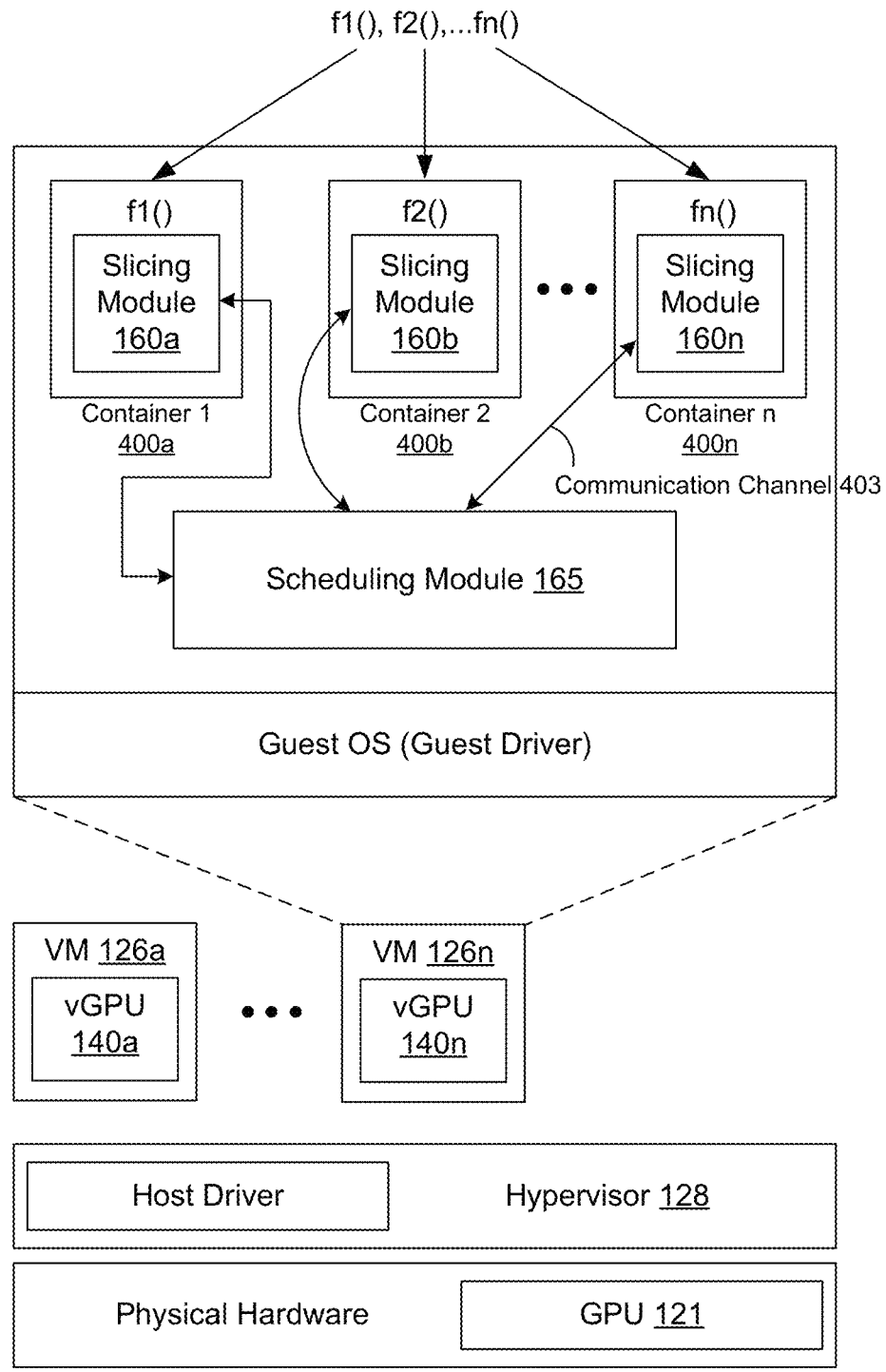
FIG. 4 is a schematic diagram showing an example of architecture of the networked computing environment of FIG. 1 for performing dynamic kernel slicing.

Turning now to FIG. 4, an example schematic diagram for performing dynamic kernel slicing is shown according to various examples. In some examples, the serverless computing service 145 can provide an API for various functions, f1( ) f2( ), . . . , fn( ) such as matrix multiplication and vector addition, to execute on a vGPU 140. As such, a developer or other end user can use the API directly from any serverless interface. The serverless computing service 145 can create or maintain containers 400a . . . 400n running inside a virtual machine 126 to host each function. In some examples, there can be a one-to-one correspondence between a container 400 and a function.

Each of the containers 400 can include an instance of the slicing module 160a . . . 160n. The slicing module 160 partitions a large size computational kernel into several small size sub-kernels, or slices. Further, the slicing module 160 oversees correct execution of the function even when different kernel slice sizes are determined. In some examples, the slicing module 160 has a configurable parameter that controls a number of threads per block, such as 1024 or other suitable number of threads per block.

Figure 5:
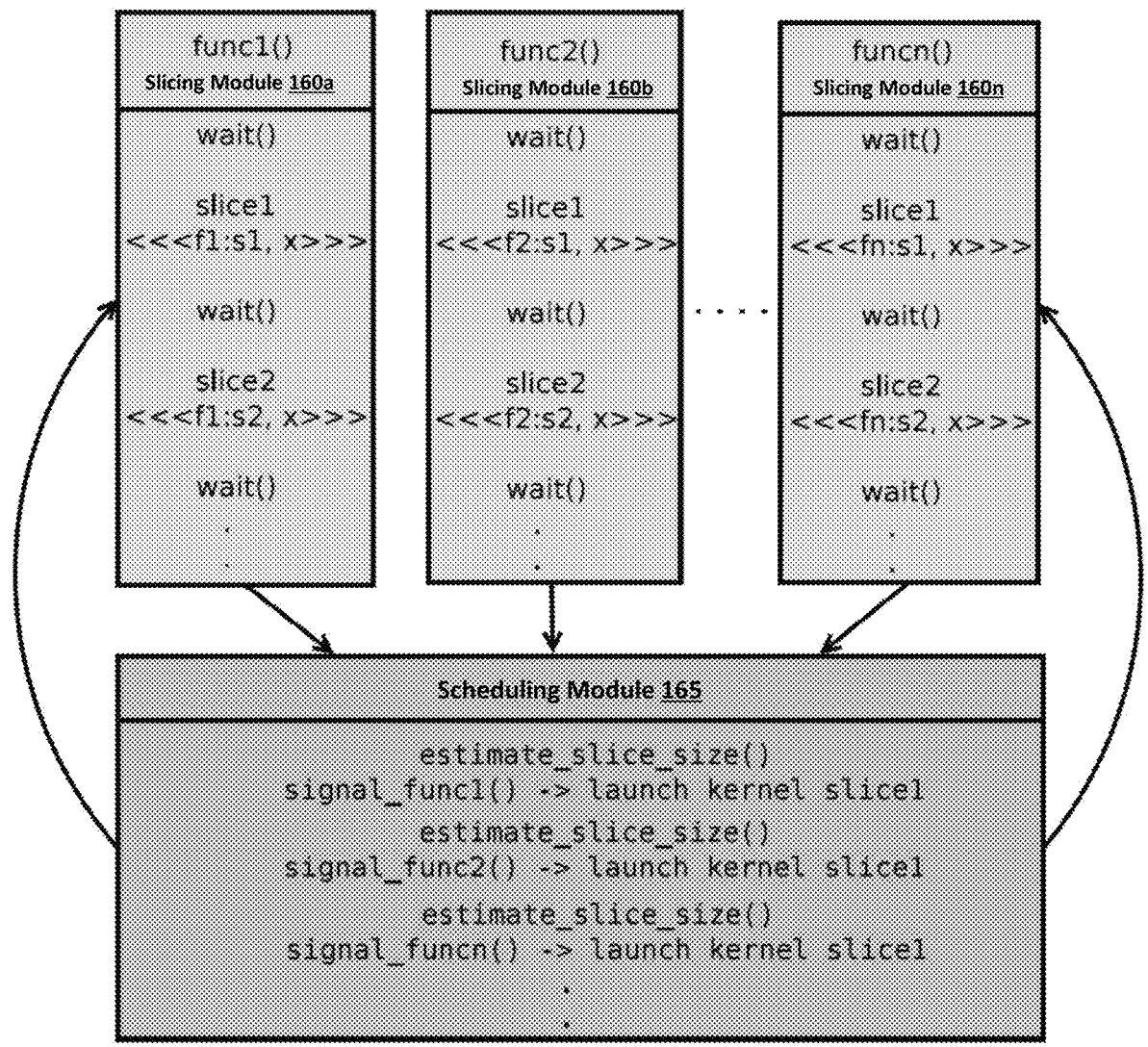
FIG. 5 is a schematic diagram showing an example of communication between a slicing module and a scheduling module in the networked computing environment of FIG. 1.

In some examples, the scheduling module 165 can include a global scheduler in a user space of the virtual machine 126. The scheduling module 165 can control the scheduling of functions hosted in the containers 400, as shown in FIG. 5. The scheduling module 165 can determine an order of the functions to use the vGPU 140 based on a predefined scheduling policy, such as round-robin scheduling, priority based scheduling, or other suitable scheduling policy.

Further, the scheduling module 165 can determine the kernel slice size, i.e., the number of blocks for a kernel launch, of the function that is to be scheduled on the vGPU 140. To this end, the scheduling module 165 can communicate the kernel slice size with the slicing modules 160 by using one or more communication channels 403 established between the slicing modules 160 and the scheduling module 165. The communication channels 403 established between the slicing modules 160 and the scheduling module 165 can be used to share required information, such as a wait signal of a function, a kernel slice size, etc., to control the scheduling of the functions. In some examples, the communication channels 403 can include one or more shared memory spaces.

Further, in some examples, the scheduling module 165 can determine scheduling decisions according to an output of an optimization function, such as an integer non-linear program, that maximizes a number of tasks completed within a deadline. In some examples, the serverless computing service 145 implements round-robin scheduling to schedule the slices of the kernel, i.e., the sub-kernels. Only one kernel is launched having a slice size greater than zero on a vGPU 140 in each round according to the result of the integer non-linear program or other optimization function. In some examples, the slice size of other functions in the round-robin queue is set to zero for that round. The serverless computing service 145 can implement the round-robin scheduling until all the computational kernels for a function determined using the optimization function are launched for execution.

To maximize a number of tasks completed within a deadline, the serverless computing service 145 can utilize an integer non-linear program or other optimization function that determines a scheduling order of functions and their tasks, as well as respective slice sizes. The variables of the optimization function, such as an integer non-linear program, can include:

$B_i$=Number of blocks in task i;
$arrival_i$=Arrival time of task i;
$start_l$=Start time of $l^{th}$ workload switch on GPU;
$end_l$=End time of $l^{th}$ workload switch on GPU;
$work_l$=Load identifier at the time of $l^{th}$ switch GPU;
L=Total number of load switch on GPU;
W=Total number of workloads;
$S_{ijlwk}$=$k^{th}$ Slice size of task i is selected in round j or not with current workload being w, l denotes the workload transition phase in the $j^{th}$ round;
$P_{ik}$=Value of $k^{th}$ slice of task i;
$y_i$=Task i is completed within deadline or not (1 or 0);
$E_{iwk}$=Expected execution time of kth slice of task i when workload is w;
$Elapsed_j$=Elapsed time till round j;
R=maximum number of rounds;
$SK_i$=Set of possible slice size for task i; and
N=Total number of task to be scheduled.

According, the goal of maximizing the number of functions completed within their time-limit can be defined as:

$$\text{maximize}(\Sigma_{i=1}^{N} y_i) \quad (\text{eq. 1}),$$

where $y_i$ can be a binary classifier denoting whether a task i is to be completed within a deadline. Additional constraints can be defined as follows:

There can be at most N empty rounds;

$$0 \leq \Sigma_{i=1}^{N} \Sigma_{l=1}^{L} \Sigma_{k=1}^{SK_i} S_{ijlck} \leq 1;$$

$$c = work_l, \forall_{j \in [1,N]} \quad (\text{eq. 2})$$

No round should be empty once a schedulable task is identified;

$$\Sigma_{i=1}^{N} \Sigma_{l=1}^{L} \Sigma_{k=1}^{SK_i} S_{ijlck} = 1; \; c = work_l, \forall_{j \in [N,R]} \quad (\text{eq. 3})$$

All blocks of a task should be scheduled for completion;

$$\Sigma_{i=1}^{N} \Sigma_{l=1}^{L} \Sigma_{k=1}^{SK_i} S_{ijlck} * P_{ik} = B_i *; \; y_i; c = work_l, \forall_i \quad (\text{eq. 4})$$

Initial elapsed time should be equal to the start of the first function to be scheduled;

$$Elapsed_1 = \Sigma_{p=1}^{N}(1-y_p)*(1-\Sigma_{i=1}^{N}\Sigma_{l=1}^{L}\Sigma_{k=1}^{SK_i} S_{ijlck})*$$
$$(arrival_{p+1} - arrival_p); \; c = work_l \quad (\text{eq. 5})$$

Keep track of the elapsed time since the start of the integer non-linear program scheduling;

$$Elapsed_j = \Sigma_{i=1}^{N} \Sigma_{m=2}^{j} \Sigma_{l=1}^{L} \Sigma_{k=1}^{SK_i} S_{ijlck} * E_{ick} + Elapsed_1;$$
$$c = work_l, \forall_{j \in [2,R]} \quad (\text{eq. 6})$$

Compete each task within its deadline;

$$\Sigma_{k=1}^{SK_i}(S_{ijlck} *(E_{ick} + Elapsed_j) \leq d_i * y_i; \; c = work_l, \forall_{i,j,l} \quad (\text{eq. 7})$$

A task cannot start before its arrival; and $$(Elapsed_j - arrival_i) * \Sigma_{l=1}^{L} \Sigma_{k=1}^{SK_i} S_{ijlck} \geq 0; \; c = work_l, \forall_{i,j} \quad (\text{eq. 8})$$

Select the slice executable table corresponding to the current workload and ensure that the slice as selected should be executed with the current workload.

$$(Elapsed_j - start_l) * \Sigma_{i=1}^{N} \Sigma_{k=1}^{SK_i} S_{ijlck} \geq 0; \; \forall_j; \forall_{l \in [1,L]};$$
$$c = work_l \quad (\text{eq. 9})$$

$$(end_l - Elapsed_j) * \Sigma_{i=1}^{N} \Sigma_{k=1}^{SK_i} S_{ijlck} -$$
$$\Sigma_{i=1}^{N} \Sigma_{k=1}^{SK_i} S_{ijlck} * E_{ick} \geq 0; \forall_j; \forall_{l \in [1,L]}; \; c = work_l \quad (\text{eq. 10}).$$

Figures 6A, 6B:
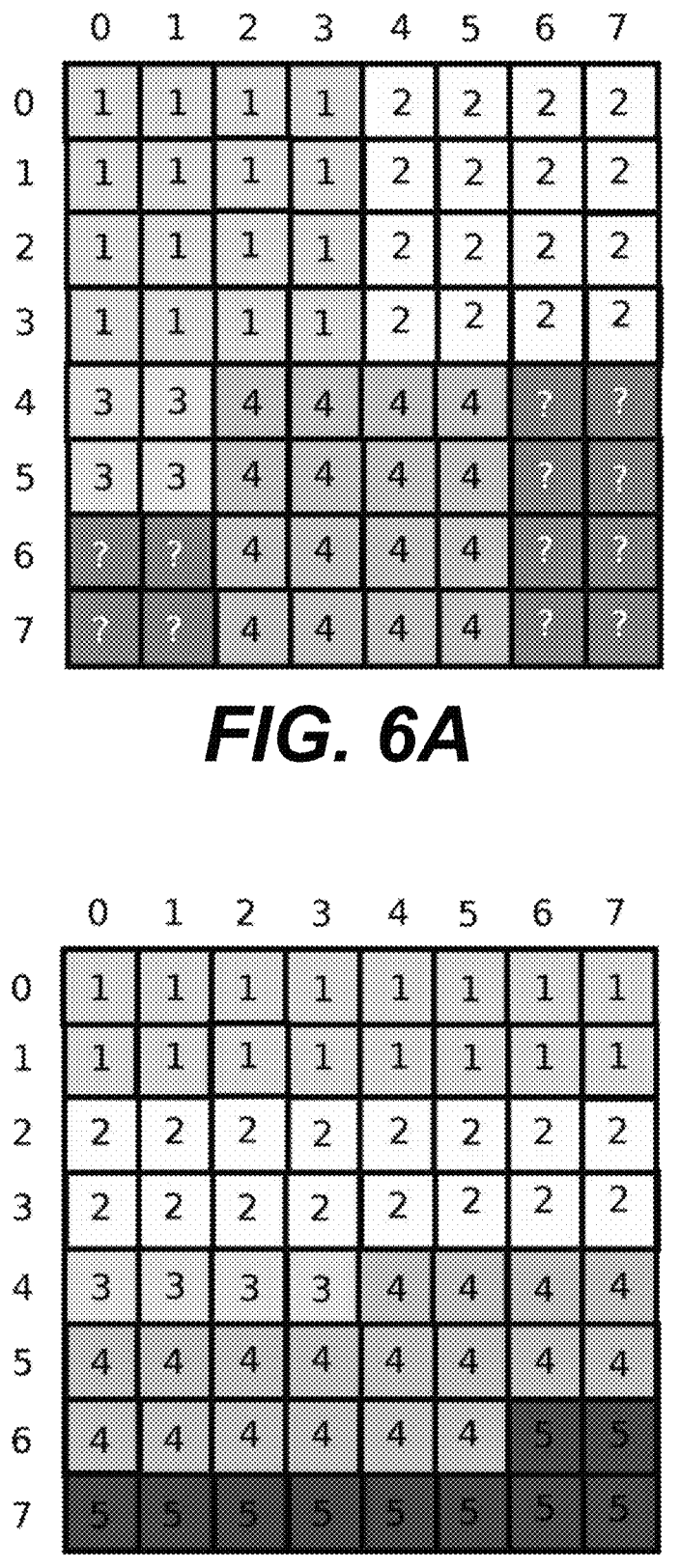

FIG. 6A shows an 8×8 thread grid with a total of 64 blocks. A computational kernel of a GPU 121 allows a kernel grid to have x and y dimensions in which thread blocks are arranged in a two-dimensional manner. The use of dynamic two-dimensional slices for slicing a two-dimensional grid creates holes and stray blocks which are difficult to trace. Each cell in FIG. 6A represents a thread block in the two-dimensional grid. Blocks with the same color belong to the same slice, and the number on the block represents the launching order of the corresponding slice.

In FIG. 6A, the first three slice sizes launched for execution are 4×4, 4×4, and 2×2. These three slice sizes cover the blocks from (0, 0) to (3, 7). When the fourth slice size is selected to be 4×4, it launches blocks from (4, 2) to (7, 5) leaving the blocks from (6, 0) to (7, 1) untraceable. This issue prevents the launch of some blocks of the kernel and causes partial execution of the kernel. To handle this issue, they-dimension of the two-dimensional slices can be set to one, which allows two-dimensional blocks to be launched in a linear order, thereby easing the traceability of blocks. In FIG. 6B, instead of launching the first slice with size 4×4, the slice of size 16×1 is launched, keeping the blocks to be launched the same. Similarly, the subsequent slice sizes are 16×1, 4×1, 16×1, and 12×1, covering the entire two-dimensional grid.

In some examples, the slicing module 160 can be implemented as a library using C and CUDA, or other suitable programming language, which can be converted into a container image to increase portability. The library can contain the definition of GPU functions, a control signal variable (sched_signal), and a data structure for controlling the scheduling of a kernel (struct_sched_info) on a vGPU 140, as shown in Table 4 below. The slicing module 160 can contain an API to use the GPU functions, such as matrix multiplication or vector addition, and provide a mechanism to control the scheduling of the computational kernel.

In some examples, the scheduling module 165 can be implemented in C or other suitable programming language. The sched_signal variable can be shared between the scheduling module 165 and a slicing module 160 using shared memory, which is used to control the scheduling and allows only one container 400 (or function) to use the vGPU 140. The scheduling module 165 is stopped when a function is already scheduled, and started after the launch and execution of a kernel, as shown in Steps 7 and 11 in Algorithm 3, shown as FIG. 7.

In some examples, the slicing module 160 can use the sched_signal to start and stop the scheduling module 165. One or more containers 400 and the scheduling module 165 can access the shared variable sched_signal at the same time resulting in race condition. In some examples, a semaphore can break the race condition for the shared variable sched_signal. The scheduling module 165 can provide round-robin and priority based scheduling; however, in some examples, only one scheduling policy can be used at a time. For instance, the scheduling module 165 can implement a round-robin strategy and take decisions on the slice size using Algorithm 1, shown in FIG. 8.

The slicing module 160 and the scheduling module 165 share information, referred to as struct_sched_info, to control the scheduling, as shown in Table 4. For instance, the struct_sched_info address can be copied from the shared memory region in the data structure created for scheduling policies (queue and priority queue) in the scheduling module 165.

TABLE 4

Variables for Scheduling (struct_sched_info)

| Variable | Type | Use | Controller |
|---|---|---|---|
| cont_id | char | Container ID | Slicing Module 160 |
| cont_wait | bool | vGPU Access Permission | Slicing Module 160 and Scheduling Module 165 |
| slice_size | unsigned int | Slice Size | Scheduling Module 165 |
| arrival | struct timeval | Arrival Time of Function | Slicing Module 160 |
| completion | struct timeval | Completion Time of Function | Slicing Module 160 |
| queue_entry | bool | Entry in Scheduling Queue | Scheduling Module 165 |
| done | bool | Job is Complete | Slicing Module 160 |

In various experiments conducted in accordance with the examples described herein, a completion time and an execution time of various slice sizes of functions were conducted for matrix addition and multiplication. Four different load scenarios on a GPU 121 were used to evaluate slice execution time, i.e., one vGPU 140, two vGPUs 140, three vGPUs 140, and four vGPUs 140, using best-effort and equal share vGPU scheduling. These values were used as input for the optimization function, which includes an integer non-linear program in the experiments. Matrix multiplication of two square matrices of size 4096×4096 using slice sizes of 4096, 2048, 1024, 512, 256, 128, and 64 was performed.

It may be possible for an optimization function to not determine a slice size in the workload variation time range satisfying a condition mentioned in Eq. 10, which can create a gap in an elapsed time calculation, shown in Eq. 6. As such, an extra slice size '0' having size 0 blocks with execution time 1, the least possible gap, was used as a filler for Eq. 10. The integer non-linear program uses the filler to fill the gap in elapsed time evaluation to estimate elapsed time correctly and avoid any straddling conditions.

As the slicing module 160 and the scheduling module 165 share information (struct_sched_info) using shared memory, the slicing module 160 and the scheduling module 165 both control the variables in the struct_sched_info data structure depending upon the usage as shown in Table 4 above. Algorithm 2, shown in FIG. 9, lists a procedure for kernel slicing and scheduling that can be implemented by the serverless computing service 145. The slice size variable stores a current number of slice sizes for a kernel launch decided by the integer non-linear program. The queue entry variable is used to tell the scheduling module 165 that an entry is present in the data structure, as shown in lines 8-11 in Algorithm 2, thereby avoiding multiple entries in the data structure. The scheduling module 165 can locate an element (sched_info) to be scheduled from the data structure depending upon a scheduling policy, such as round-robin or priority based scheduling, and can determine the slice size of the element using Algorithm 1. The scheduling module 165 allows the function associated with element to launch the kernel, as can be seen from lines 22 and 23 in Algorithm 2.

In some examples, the serverless computing service 145 can provided for the addition of functions and library using the routine shown in Algorithm 3. More specifically, a developer can create a struct_sched_info data structure for a new function, and corresponding container 400, in the shared memory region. Thereafter, the developer can allocate the required memory on the vGPU 140 and wait for a signal from the scheduling module 165 to use the vGPU 140. After receiving a signal from the scheduling module 165, the slicing module 160 can stop the scheduling module 165 and launch a sub-kernel with a slice size provided by the scheduling module 165, assuming the slice size is greater than zero. After completing the current sub-kernel execution on the vGPU 140, the function can be placed in a holding state and the scheduling module 165 can be restarted. Steps 6 to 22 in Algorithm 3 can be repeated until the completion of the function and, thereafter, the scheduling module 165 can be notified that the job is complete. The shared space can be updated as being empty and the vGPU 140 can be freed in memory.

Various experiments were performed in accordance with the examples described herein. Each container 400 was hosted inside a virtual machine 126 running on a physical host having a hypervisor 128, such as VMware® ESXi 6.5.0, although other hypervisors 128 can be employed. The host machine included thirty-six Intel® Xeon® Gold 6140 CPU @ 2.30 GHz processors, 766.69 GB memory, and 5.33 TB secondary storage. Each virtual machine 126 had 16 vCPU, 64 GB memory, 100 GB of physical storage, and CentOS 7.0 installed as an operating system. A GPU 121, such as NVIDIA® Tesla P100, was used with 16 GB memory. Each virtual machine 126 had a 4q vGPU profile 137 and employed best-effort scheduling. The load on the GPU 121 was varied by running additional virtual machines 126 with a workload 150 of a convolutional neural network (around 92% utilization of the vGPU 140), along with virtual machines 126 hosting the functions.

Static slicing was employed using round-robin and earliest-deadline-first scheduling and compared to a base case of default scheduling without slicing. Four processes with different arrival time and deadline, shown in Table 5, were considered. All four processes performed matrix multiplication of two square matrices having size 4096×4096. Initially, only one virtual machine 126 hosting the functions was running and the workload on the GPU 121 changed at 231 ms by running an additional virtual machine 126 with a workload 150 of a convolutional neural network.

TABLE 5

Arrival Time and Deadline of Processes

| Process | Arrival Time (ms) | Deadline (ms) | Function | Size |
|---|---|---|---|---|
| $P_1$ | 0 | 400 | Matrix_Mult | 4096 × 4096 |
| $P_2$ | 100 | 1700 | Matrix_Mult | 4096 × 4096 |
| $P_3$ | 300 | 900 | Matrix_Mult | 4096 × 4096 |
| $P_4$ | 500 | 1400 | Matrix_Mult | 4096 × 4096 |

The four tasks shown in Table 5 were scheduled according to arrival order (first-come-first serve scheduling) on the vGPU 140, which used best-effort scheduling. The best-effort scheduling performs scheduling of tasks in a round-robin order at both levels, the vGPU 140 and the GPU 121. The execution time of all four tasks $P_1$, $P_2$, $P_3$, and $P_4$ were found to be 1707, 2201, 2303, and 2880, respectively. It is thereby evident that default scheduling is not able to complete any processes within their time limit as the scheduling does not consider the deadline of a process and workload change on the GPU 121 while making scheduling decisions. Instead, it is desirable to slice a kernel of a task to have more control over the scheduling, and to consider a load on a GPU 121.

Figure 10:
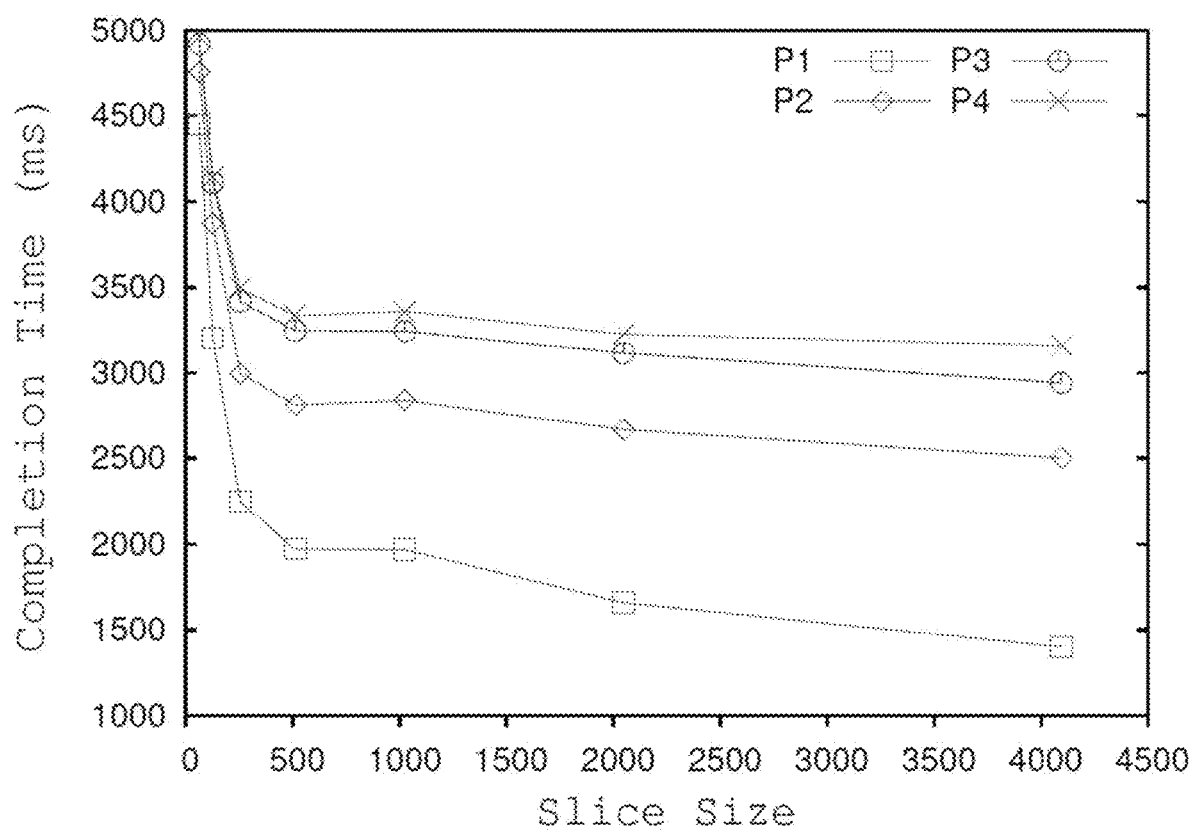
FIG. 10 is a chart illustrating completion time of different slice sized using round-robin scheduling.

As such, seven different slice sizes of 64, 128, 256, 512, 1024, 2048, and 4096 were used to schedule tasks to execute a computational kernel. Table 3 shows the execution time of slice sizes under no additional virtual machine 126 and one additional virtual machine 126 running a workload 150 of a convolutional neural network. The load conditions of the GPU 121 are listed above in Table 3. Two different scheduling policies, round-robin and earliest-deadline-first scheduling, were used to find the execution time of the four processes mentioned in Table 5 using the varying slice sizes. With respect to the round-robin scheduling, the execution time of the four processes with different slice size is shown in FIG. 10. As can be seen in FIG. 10, the completion time of all four processes decreases by increasing the slice size. No process completes its execution within its deadline using round-robin scheduling with different slice size options. With respect to earliest-deadline-first scheduling, the scheduling policy stops execution of a task before completion if the task has already passed the deadline. As such, earliest-deadline-first scheduling was not able to complete any of the tasks shown in Table 5, even using seven different slice sizes. Notably, earliest-deadline-first scheduling considers the deadline of processes in making a scheduling decision, but fails due to its greedy approach.

Instead, in various examples described herein, the server-less computing service 145 utilizes an optimization function of an integer non-linear program to make scheduling decisions as a function of an arrival time and a deadline of a process, as well as load change on a GPU 121. The integer non-linear program provides the scheduling order for the processes mentioned in Table 5, which maximizes the total number of tasks completed within its deadline. Two tasks, $P_2$ and $P_4$, were completed within their deadline by using schedule order <function name: slice size> fP2: 0, P2: 2048, P2: 4096, P2: 4096, P2:4096, P4:4096, P4:4096, P4:4096, P4:4096, P2:2048, and P2:4096g. The first slice size for process $P_2$ is zero, which is required to avoid straddling between workload change at 231 ms.

The completion time of the integer non-linear program can depend upon several parameters, such as a number of tasks, slice size options, rounds, workload switches on the GPU 121, etc. The result of scalability of the integer non-linear program by varying the number of tasks (N), slice size options ($SK_i$), and rounds (R) (R>=N) is shown in Table 6 below. The slice sizes of 64, 128, and 256 were discarded due to their higher task completion time, as shown in FIG. 3. The larger slice size was retained as the number of rounds required to find the optimal solution is inversely proportional to the slice size. In Table 6, we can see that the completion time of the integer non-linear program increases by increasing the number of tasks, rounds, and slice size options with the exception of four tasks with four and five slice size options with 12 rounds. The completion time is also dependent upon the task arrival and the deadline.

TABLE 6

Completion Time of INLP to Determine Schedule Order

| Number of Tasks | Number of Slice Size Options | Number of Rounds | Time (s) |
|---|---|---|---|
| 4 | 4 | 20 | 11.3 |
|  |  | 16 | 3.2 |
|  |  | 12 | 0.96 |
|  | 5 | 20 | 18.7 |
|  |  | 16 | 5.8 |
|  |  | 12 | 0.7 |
| 8 | 4 | 20 | 58 |
|  |  | 16 | 13 |
|  |  | 12 | 1.2 |
|  | 5 | 20 | 98 |
|  |  | 16 | 19 |
|  |  | 12 | 2.6 |

TABLE 6-continued

Completion Time of INLP to Determine Schedule Order

| Number of Tasks | Number of Slice Size Options | Number of Rounds | Time (s) |
|---|---|---|---|
| 12 | 4 | 20 | 122 |
|  |  | 16 | 13.6 |
|  |  | 12 | 7.3 |
|  | 5 | 20 | 166 |
|  |  | 16 | 22.6 |
|  |  | 12 | 4.3 |
| 16 | 4 | 20 | 204 |
|  |  | 16 | 4.7 |
|  | 5 | 20 | 186 |
|  |  | 16 | 6.2 |

In Table 6, it can be seen that, as the number of tasks, the number of rounds, and the number of slices are increased, the run time of the integer non-linear program increases substantially. For instance, the run time changes from 0.96 seconds for 4 tasks, 12 rounds, and 4 slices to 204 seconds for 16 tasks, 20 rounds, and 4 slices. Such run times renders the integer non-linear program unusable for determine a scheduling order for a large number of tasks simultaneously. However, this scalability issue can be resolved by executing the integer non-linear program on a fraction of total tasks at a time, referred to as window. For example, if one-hundred tasks are pending and a window includes four tasks, it will take twenty-five executions of the integer non-linear program to determine a scheduling order. The size of the window is a tunable parameter and can be adjusted accordingly by an end user. Running the integer non-linear program on a window of tasks, instead of giving all the tasks as input at the same time, reduces the total runtime of the integer non-linear program. However, the scheduling order obtained with the window based approach can be sub-optimal, considering integer non-linear program has a restricted view of the tasks.

In various experiments performed in accordance with the examples described herein, a data set was created to compare the performance of the scheduling approach with round-robin and earliest-deadline-first scheduling policies. The number of tasks completed within their deadline was measured by varying several parameters, such as the number of tasks, load variation on the GPU 121, variation in task mix, deadline distribution, and slice size. Two different tasks were used in terms of their size and execution time, namely, square matrix multiplication (4096×4096) and square matrix multiplication (2048×2048). Native execution time without an additional virtual machine 126 on the GPU 121 of both tasks were measured at 344 ms and 44 ms respectively. The values of other parameters were used, as shown in the Table 7.

TABLE 7

Values of Parameters in Data Set

| Parameter | Values |
|---|---|
| Task Arrival Rate | 4 Tasks per Second |
| Tasks Inter-arrival Pattern | Exponential |
| Deadline Variation Range | [2x-5x], [3x-6x] |
| Deadline Distribution | Uniform |
| Types of Tasks | mult_4096, mult_2048 |
| Tasks Mix | {75%, 25%}, {50%, 50%} |
| Number of Tasks | 100, 200, 300, 400 |
| Load Variation Cycle on GPU | Every 600 ms |

TABLE 7-continued

Values of Parameters in Data Set

| Parameter | Values |
|---|---|
| Load Percentage Distribution on GPU (Load: 1 to 4) {1 VM, 2 VM, 3 VM, 4VM} | Load 1: {10%, 25%, 25%, 40%}, Load 2: {20%, 25%, 25%, 30%}, Load 3: {30%, 25%, 25%, 20%}, Load 4: {40%, 25%, 25%, 10%}, |
| Load Change Pattern on GPU | Random |

The data set was generated for experimental evaluation of the examples described herein. A data set generator used a task arrival rate, different types of tasks, ratio of different tasks (task mix), deadline variation range, and total number of tasks to be generated as input parameters. The data set generator generated the number of tasks specified by a user with a given arrival rate. The task mix specified the ratio of different type of tasks in the generated task sequence. Exponential task inter-arrival time was assumed. An incoming task can belong to any one of the task type specified by the user with the task mix being kept the same as specified by the user. The deadline variation range specifies the factor by which the task deadline can vary. The deadline factor is multiplied by the native runtime of the task to get the task deadline value. The deadline factor was assumed to be uniformly distributed over the specified deadline variation range. The load variation on the GPU 121 was randomly generated among one virtual machine 126, two virtual machines 126, three virtual machines 126, and four virtual machines 126. Additional virtual machines 126 executed a workload 150 of a convolutional neural network. The values of each parameter used to create the data set are shown above in Table 7.

Seven slice size were used, including 4096, 2048, 1024, 512, 256, 128, and 64, but one slice size was used at a time for round-robin and earliest-deadline-first scheduling. Round-robin scheduling performed poorly in terms of completing the tasks within their deadline. The maximum number of tasks completed by round robin is eighteen, and most were observed in single digits or zero.

It was observed that earliest-deadline-first scheduling had much better performance when compared to round-robin in all instances. Table 8 shows the number of tasks completed by earliest-deadline-first scheduling in every test case. Table 8 contains only the highest value given by the earliest-deadline-first scheduling using a different slice size. Slice size 4096 performed better than other slice sizes in almost every case. Earliest-deadline-first scheduling also performed better in 50-50% task mix compared to 75-25% as square matrix multiplication of size 4096×4096 is much more computationally intensive when compared to 2048×2048. Performance of the earliest-deadline-first scheduling improved by decreasing the load on the GPU 121, as shown in Table 8, from Load 1 (the highest load) to Load 4 (the lowest load).

Figure 11:
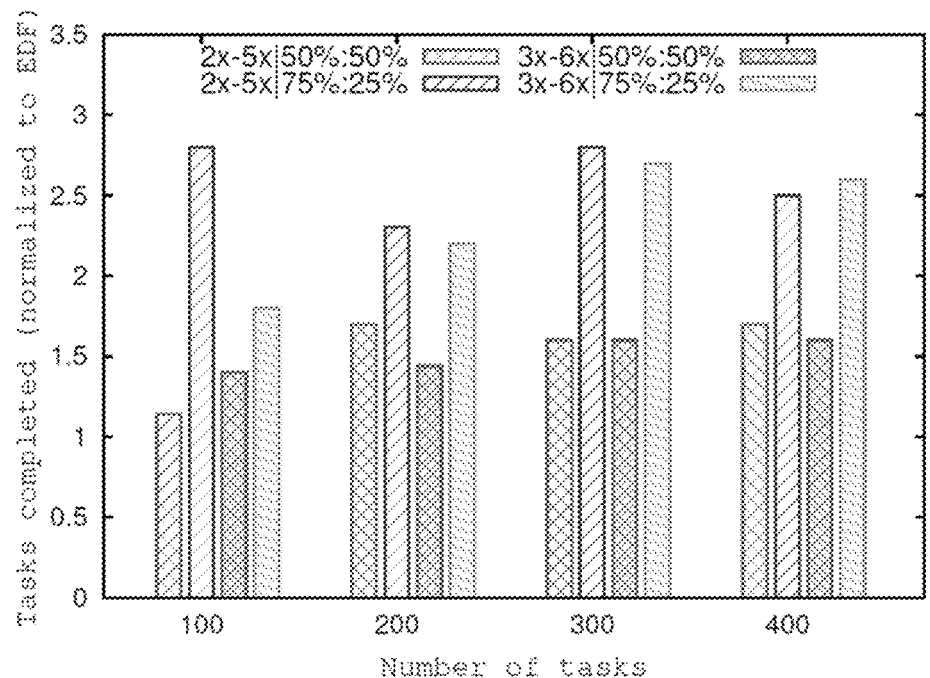
FIGS. 11-14 are charts illustrating a number of tasks completed with different load variations according to the examples described herein.
Figure 12:
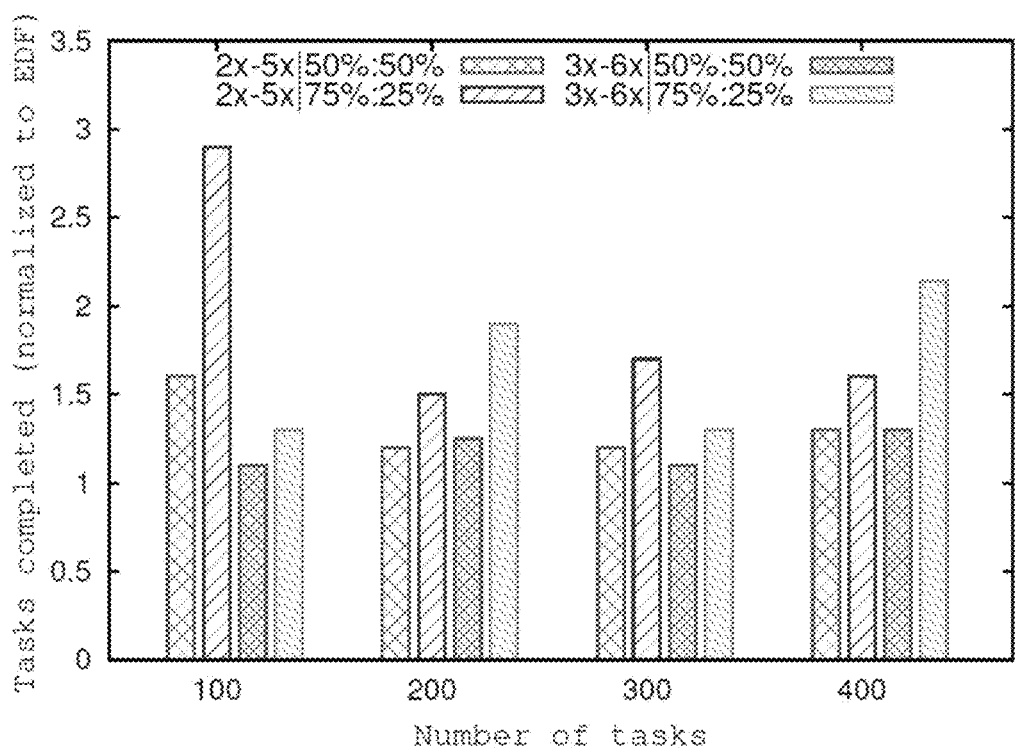
Figure 13:
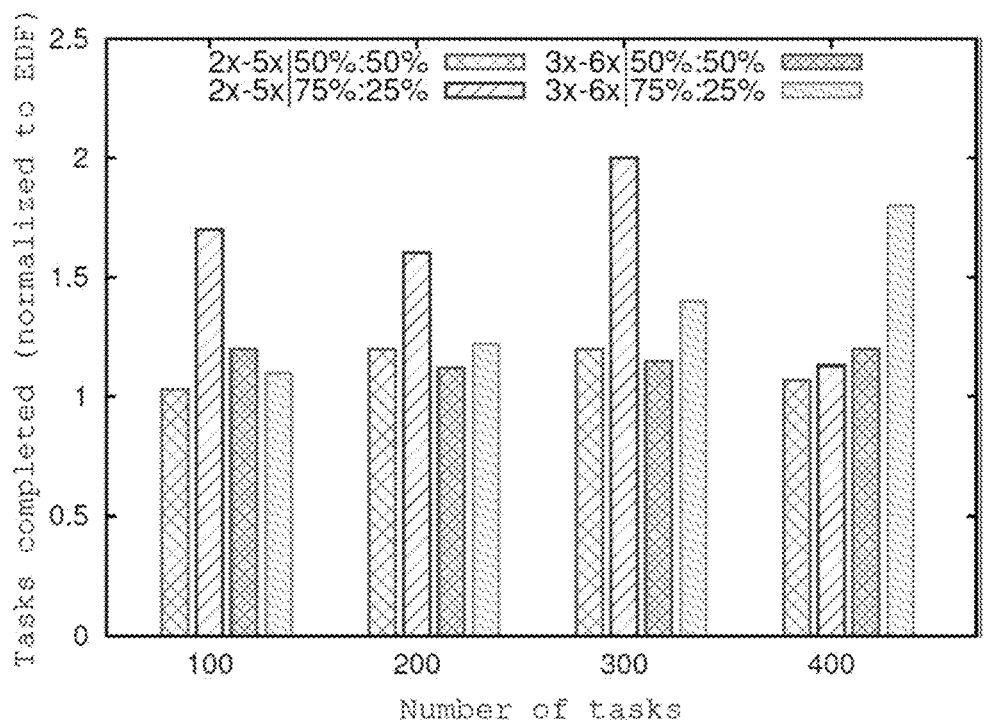
Figure 14:
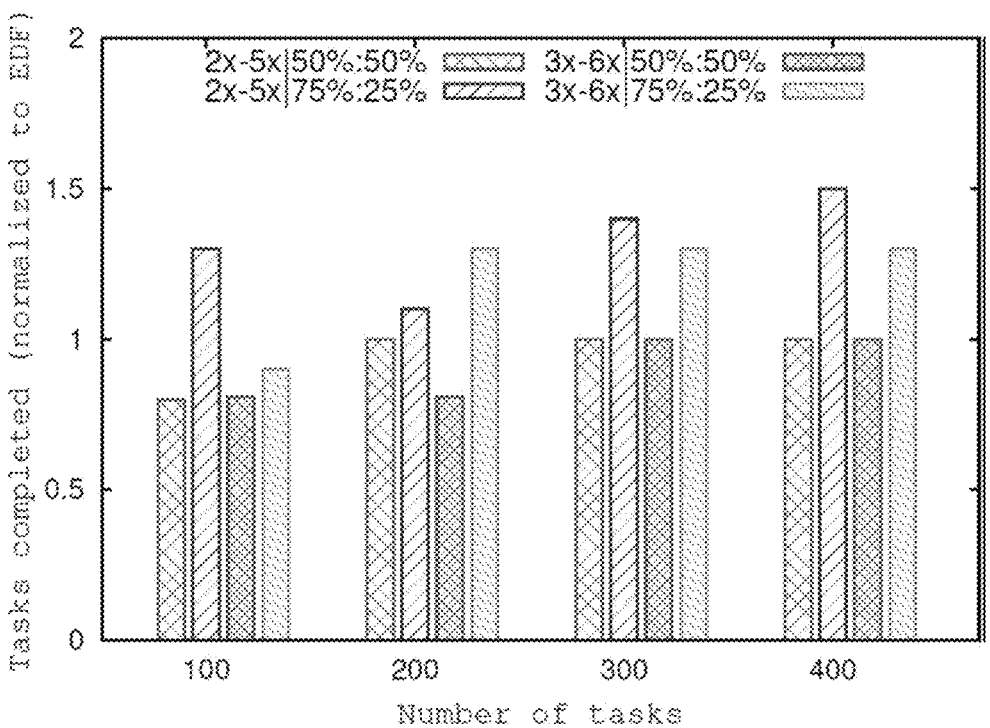

However, the examples described herein for dynamic kernel slicing and the use of the optimization function, performed better than earliest-deadline-first scheduling except in low load conditions (Load 4) on the GPU 121 with 50-50% task mix, as shown in FIG. 14. The values shown in FIGS. 11, 12, 13, and 14 are normalized to the respective values of earliest-deadline-first scheduling, shown in Table 8. The examples described herein performed best when the load on the GPU 121 was high (Loads 1 and 2) and the task mix was 75-25% (mostly computationally intensive tasks) compared to earliest-deadline-first scheduling, in fact, up to 2.9 times better, as shown in FIGS. 11 and 12. The relative performance of the examples described herein decreased by decreasing the load on the GPU 121 with respect to earliest-deadline-first scheduling, as shown in FIGS. 11, 12, 13, and 14. The examples described herein also performed better than earliest-deadline-first when deadlines are close to base case execution time (2-5×) and when task mix was 75-25%, even in lowest load conditions, as shown in FIG. 14.

TABLE 8

Number of Tasks Completed within Deadline using EDF Scheduling

| No. of Tasks | % Variation (Tasks) | Deadline Variation | Tasks Completed within Deadline | | | |
|---|---|---|---|---|---|---|
| | | | Load: 1 | Load: 2 | Load: 3 | Load: 4 |
| 100 | 50/50 | 2x-5x | 14 | 12 | 33 | 45 |
| | | 3x-6x | 13 | 29 | 33 | 48 |
| | 75/25 | 2x-5x | 5 | 8 | 16 | 26 |
| | | 3x-6x | 12 | 23 | 31 | 44 |
| 200 | 50/50 | 2x-5x | 24 | 50 | 63 | 79 |
| | | 3x-6x | 36 | 48 | 66 | 95 |
| | 75/25 | 2x-5x | 14 | 26 | 33 | 51 |
| | | 3x-6x | 18 | 28 | 54 | 60 |
| 300 | 50/50 | 2x-5x | 33 | 60 | 79 | 113 |
| | | 3x-6x | 52 | 82 | 133 | 122 |
| | 75/25 | 2x-5x | 18 | 42 | 43 | 79 |
| | | 3x-6x | 24 | 57 | 64 | 77 |
| 400 | 50/50 | 2x-5x | 44 | 70 | 110 | 153 |
| | | 3x-6x | 67 | 105 | 143 | 168 |
| | 75/25 | 2x-5x | 22 | 49 | 82 | 80 |
| | | 3x-6x | 33 | 48 | 72 | 107 |

Figure 15:
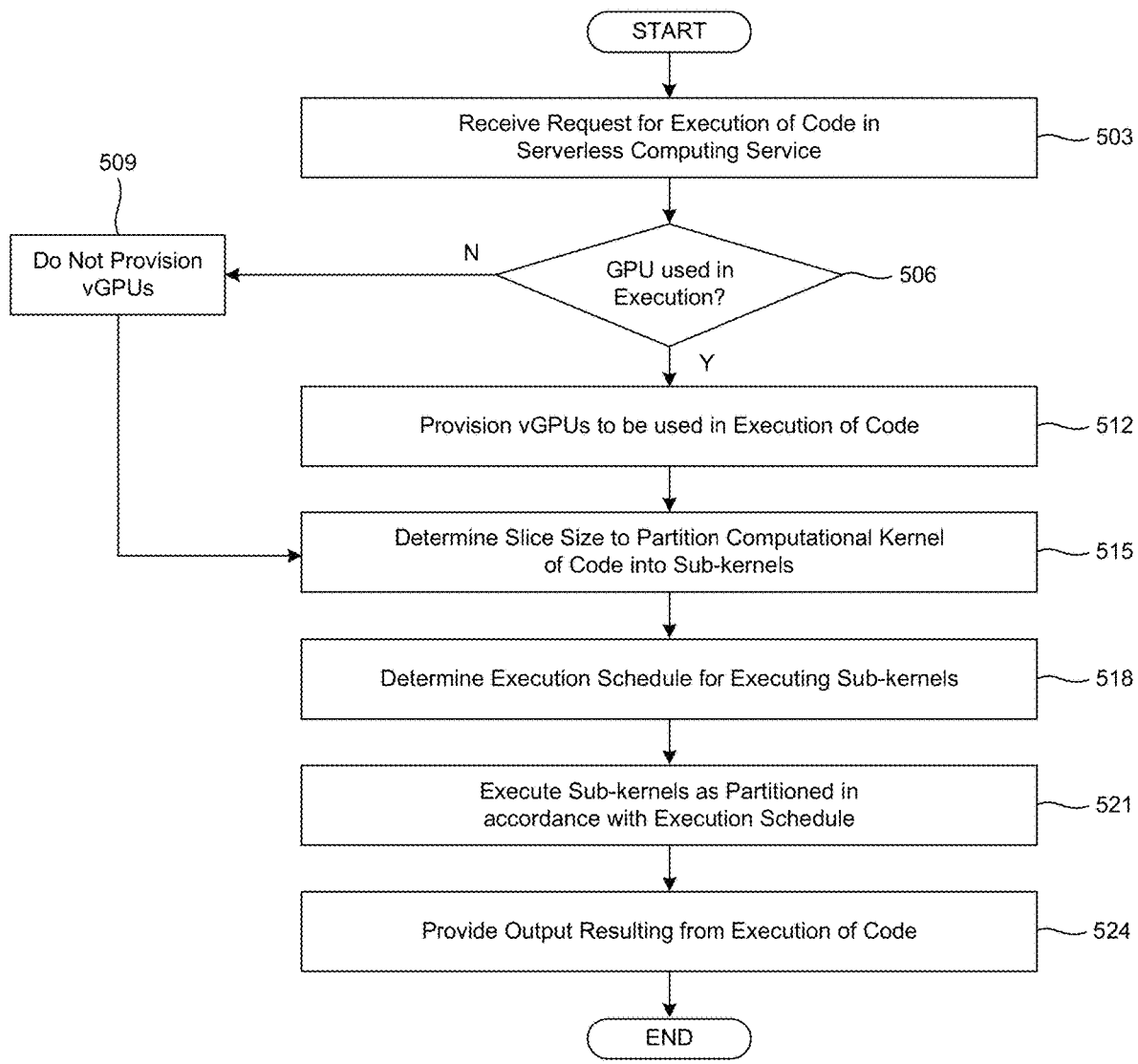
FIG. 15 is flowcharts illustrating functionality implemented by components of the networked computing environment of FIG. 1.

Moving on to FIG. 15, a flowchart is shown that provides one example of the operation of a portion of the networked environment 100. The flowchart of FIG. 15 can be viewed as depicting an example of elements of a method implemented by the serverless computing service 145 executing in the computing environment 103 according to one or more examples. The separation or segmentation of functionality as discussed herein is presented for illustrative purposes only.

In step 503, the computing environment 103 receive a request for execution of code by the serverless computing service 145. For instance, the computing environment 103 can provide a serverless computing environment that allows developers and other end users to provide code for execution. A developer, a third-party computing service, or other user can upload a program, application, or other code to execute without having to provision and maintain a server. For instance, in some examples, a developer or other end user can access a user interface served up by the serverless computing service 145 to upload, copy and paste, or otherwise provide code to execute by the serverless computing service 145. In other examples, the developer or other end user can access the serverless computing service 145 through one or more APIs to provide code for the serverless computing service 145 to execute.

In step 506, the computing environment 103 determines whether a GPU 121 is to be used in execution of the code by the serverless computing service 145. In some examples, the developer or other end user can configure settings associated with the execution of the code. For instance, the developer can specify in a user interface or API request whether one or more GPUs 121 or vGPUs 140 should be utilized in the execution of the program code, which can decrease the execution time and the amount of resources utilized in the execution of the program code.

In other examples, the computing environment 103 can automatically identify whether speed up in execution of the code can be achieved, for instance, based on a function call. For instance, if a function call includes a call to a matrix multiplication routine, the computing environment 103 can identify, based on the parameters of the matrix multiplication routine, whether portions of the matrix multiplication routine can be performed concurrently or in parallel. In other words, when portions of the code can be executed in parallel, the computing environment 103 can invoke a GPU 121 to speedup execution of the code, providing an output faster to the developer or other end user.

If the computing environment 103 determines that a GPU 121 is not to be used in execution of the code, the process can proceed to step 509. In step 509, the computing environment 103 does not provision any vGPUs 140, and the process proceeds to step 515 as will be discussed. Notably, the process can proceed using traditional CPU architecture although parallel execution will not be achieved using one or more GPUs 121.

Referring again to step 506, if the computing environment 103 determines that a GPU 121 is to be used in execution of the code, the process can proceed to step 512. In step 512, the computing environment 103 can provision one or more vGPUs 140 to be used in execution of the code. For instance, in some examples, the serverless computing service 145 can provide an application programming interface for various functions, f1( ), f2( ), . . . , fn( ) such as matrix multiplication and vector addition, to execute on a vGPU 140. To this end, in some examples, the serverless computing service 145 can create or maintain containers 400 running inside a virtual machine 126 to host each function, where the containers 400 invoke operations of a vGPU 140. It is thus understood that, in some examples, the vGPUs 140 are not provisioned in response to execution of code, but are instead executed and maintained in the event a function is invoked by code provided by one or more developers.

In step 515, the computing environment 103 determines a slice size to partition computational kernel of the code into a plurality of sub-kernels. In some examples, a scheduling module 165 of the computing environment 103 can determine a kernel slice size, i.e., the number of blocks, of a function that is to be scheduled on a vGPU 140. The slice size of the kernels can be determined as a function of a load on a GPU 121, an execution deadline, a number of blocks in a task of the compute kernel, an arrival time of the task, a start time of a workload switch on the GPU, an end time of the workload switch on the GPU, a load at the time of the workload switch on the GPU, a total number of load switches on the GPU, a set of possible slice sizes for the task, a total number of workloads, an expected execution time of one of the sub-kernels, an elapsed time, a total number of tasks to be scheduled, as well as other factors as can be appreciated.

In some examples, the scheduling module 165 can communicate a kernel slice size with one or more slicing modules 160 using a communication channels 403 established between the slicing modules 160 and a scheduling module 165 of the computing environment 103. The communication channels 403 established between the slicing modules 160 and the scheduling module 165 can be used to share required information, such as a wait signal of a function, a kernel slice size, etc., to control the scheduling of the functions. In some examples, the communication channels 403 can include one or more shared memory spaces.

In step 518, the computing environment 103 can determine an execution schedule for executing the sub-kernels.

The execution schedule can include an order of execution of the sub-kernels, and potentially other kernels or sub-kernels, on a vGPU 140 and/or underlying GPU 121. In some examples, the computing environment 103 includes a scheduling module 165 that determines scheduling decisions according to an output of an optimization function, such as an integer non-linear program, that maximizes a number of tasks completed within a deadline. In some examples, the serverless computing service 145 implements round-robin scheduling to schedule the slices of the kernel or, in other words, the sub-kernels. While steps 515 and 518 are shown separately, in some examples, steps 515 and 518 are performed concurrently, for instance, using the optimization function.

In step 521, the computing environment 103 executes the sub-kernels as partitioned in accordance with the execution schedule determined in step 518. In some examples, the serverless computing service 145 can implement the round-robin scheduling until all the computational kernels for a function determined using the optimization function are launched for execution.

In step 524, after execution, the serverless computing service 145 provides the developer with data or other output resulting from execution of the code. Thereafter, the process can proceed to completion.

Stored in the memory device are both data and several components that are executable by the processor. Also stored in the memory can be a data store 131 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 109 can be used to access user interfaces generated to configure or otherwise interact with the serverless computing service 145 or the computing environment 103. These client devices 109 can include a display upon which a user interface generated by a client application for providing a virtual desktop session (or other session) can be rendered. In some examples, the user interface can be generated using user interface data provided by the computing environment 103. The client device 109 can also include one or more input/output devices that can include, for example, a capacitive touchscreen or other type of touch input device, fingerprint reader, or keyboard.

Although the serverless computing service 145, the hypervisor 128, virtual machines 126, vGPUs 140, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for dynamic kernel slicing in a serverless computing service, comprising:
   at least one computing device;
   program instructions stored in memory and executable in the at least one computing device that, when executed by the at least one computing device, direct the at least one computing device to:
   receive a request for execution of program code in the serverless computing service in which a plurality of virtual graphics processing units (vGPUs) are used in the execution of the program code on an underlying physical graphics processing unit (GPU);
   in response to receipt of the request for execution of the program code, determine a slice size to partition a compute kernel of the program code into a plurality of sub-kernels for concurrent execution by the vGPUs, the slice size being determined for individual ones of the sub-kernels using an optimization function in accordance with a scheduling policy;
   determine an execution schedule for executing the individual ones of the sub-kernels on the vGPUs in accordance with the scheduling policy; and
   execute the sub-kernels on the vGPUs as partitioned in accordance with the execution schedule.

2. The system of claim 1, wherein:
   the request for execution of the program code is associated with an execution deadline; and
   the individual ones of the sub-kernels are scheduled in accordance with the scheduling policy based at least in part on the execution deadline.

3. The system of claim 2, wherein the execution schedule and the slice size are determined as a function of at least two of:
   the execution deadline, a number of blocks in a task of the compute kernel, an arrival time of the task, a start time of a workload switch on the GPU, an end time of the workload switch on the GPU, a load at the time of the workload switch on the GPU, a total number of load switches on the GPU, a set of possible slice sizes for the task, a total number of workloads, an expected execution time of one of the sub-kernels, an elapsed time, and a total number of tasks to be scheduled.

4. The system of claim 3, wherein:
   the scheduling policy maximizes a number of tasks completed with the execution deadline; and
   the execution schedule and the slice size are determined using the optimization function in accordance with the scheduling policy.

5. The system of claim 4, wherein the optimization function comprises an integer non-linear program (INLP).

6. The system of claim 5, wherein the scheduling policy is further determined using a round-robin routine or a priority-based routine.

7. The system of claim 1, wherein the at least one computing device is further directed to assign the individual ones of the sub-kernels to a corresponding one of a plurality of containers of at least one virtual machine.

8. A method for dynamic kernel slicing in a serverless computing service, comprising:
   receiving a request for execution of program code in the serverless computing service in which a plurality of virtual graphics processing units (vGPUs) are used in the execution of the program code on an underlying physical graphics processing unit (GPU);
   in response to receipt of the request for execution of the program code, determining a slice size to partition a compute kernel of the program code into a plurality of sub-kernels for concurrent execution by the vGPUs, the slice size being determined for individual ones of the sub-kernels using an optimization function in accordance with a scheduling policy;
   determining an execution schedule for executing the individual ones of the sub-kernels on the vGPUs in accordance with the scheduling policy; and
   executing the sub-kernels on the vGPUs as partitioned in accordance with the execution schedule.

9. The method of claim 8, wherein:
   the request for execution of the program code is associated with an execution deadline; and
   the individual ones of the sub-kernels are scheduled in accordance with the scheduling policy based at least in part on the execution deadline.

10. The method of claim 9, wherein the execution schedule and the slice size are determined as a function of at least two of:
    the execution deadline, a number of blocks in a task of the compute kernel, an arrival time of the task, a start time of a workload switch on the GPU, an end time of the workload switch on the GPU, a load at the time of the workload switch on the GPU, a total number of load switches on the GPU, a set of possible slice sizes for the task, a total number of workloads, an expected execution time of one of the sub-kernels, an elapsed time, and a total number of tasks to be scheduled.

11. The method of claim 10, wherein:
    the scheduling policy maximizes a number of tasks completed with the execution deadline; and
    the execution schedule and the slice size are determined using the optimization function in accordance with the scheduling policy.

12. The method of claim 11, wherein the optimization function comprises an integer non-linear program (INLP).

13. The method of claim 12, wherein the scheduling policy is further determined using a round-robin routine or a priority-based routine.

14. The method of claim 8, further comprising assigning the individual ones of the sub-kernels to a corresponding one of a plurality of containers of at least one virtual machine.

15. A non-transitory computer-readable medium comprising program instructions for dynamic kernel slicing in a serverless computing service that, when executed by at least one computing device, direct the at least one computing device to:
    receive a request for execution of program code in the serverless computing service in which a plurality of virtual graphics processing units (vGPUs) are used in the execution of the program code on an underlying physical graphics processing unit (GPU);

in response to receipt of the request for execution of the program code, determine a slice size to partition a compute kernel of the program code into a plurality of sub-kernels for concurrent execution by the vGPUs, the slice size being determined for individual ones of the sub-kernels using an optimization function in accordance with a scheduling policy;

determine an execution schedule for executing the individual ones of the sub-kernels on the vGPUs in accordance with the scheduling policy; and execute the sub-kernels on the vGPUs as partitioned in accordance with the execution schedule.

16. The non-transitory computer-readable medium of claim 15, wherein:
the request for execution of the program code is associated with an execution deadline; and
the individual ones of the sub-kernels are scheduled in accordance with the scheduling policy based at least in part on the execution deadline.

17. The non-transitory computer-readable medium of claim 16, wherein the execution schedule and the slice size are determined as a function of at least two of: the execution deadline, a number of blocks in a task of the compute kernel, an arrival time of the task, a start time of a workload switch on the GPU, an end time of the workload switch on the GPU, a load at the time of the workload switch on the GPU, a total number of load switches on the GPU, a set of possible slice sizes for the task, a total number of workloads, an expected execution time of one of the sub-kernels, an elapsed time, and a total number of tasks to be scheduled.

18. The non-transitory computer-readable medium of claim 17, wherein:
the scheduling policy maximizes a number of tasks completed with the execution deadline; and
the execution schedule and the slice size are determined using the optimization function in accordance with the scheduling policy.

19. The non-transitory computer-readable medium of claim 18, wherein the optimization function comprises an integer non-linear program (INLP).

20. The non-transitory computer-readable medium of claim 15, wherein the at least one computing device is further directed to assign the individual ones of the sub-kernels to a corresponding one of a plurality of containers of at least one virtual machine.

* * * * *